May 8, 1928.
F. KOHLBERGER
WINDSHIELD
Filed June 17, 1926
1,668,682
3 Sheets-Sheet 2
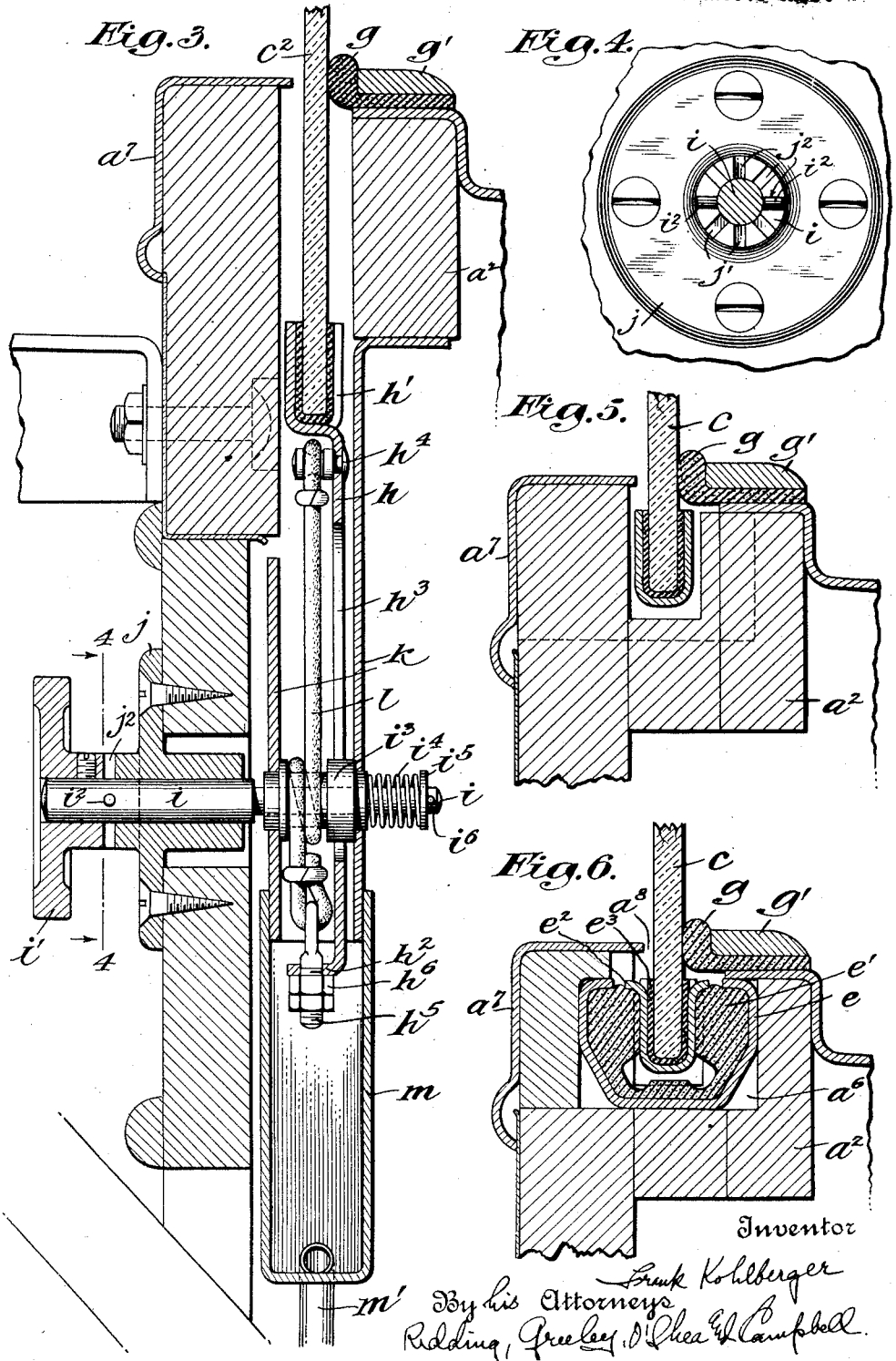
Inventor
Frank Kohlberger
By his Attorneys
Redding, Greeley, O'Shea & Campbell

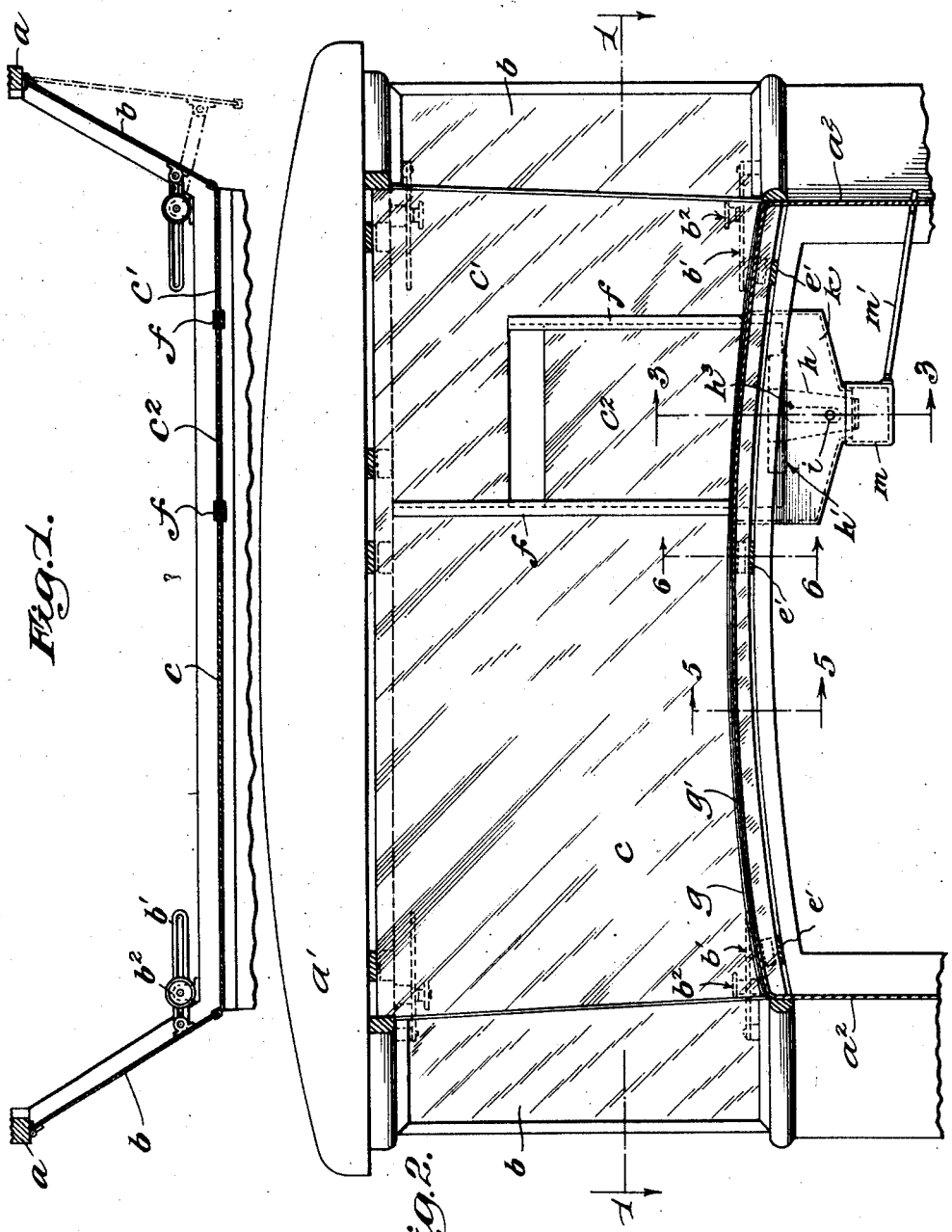

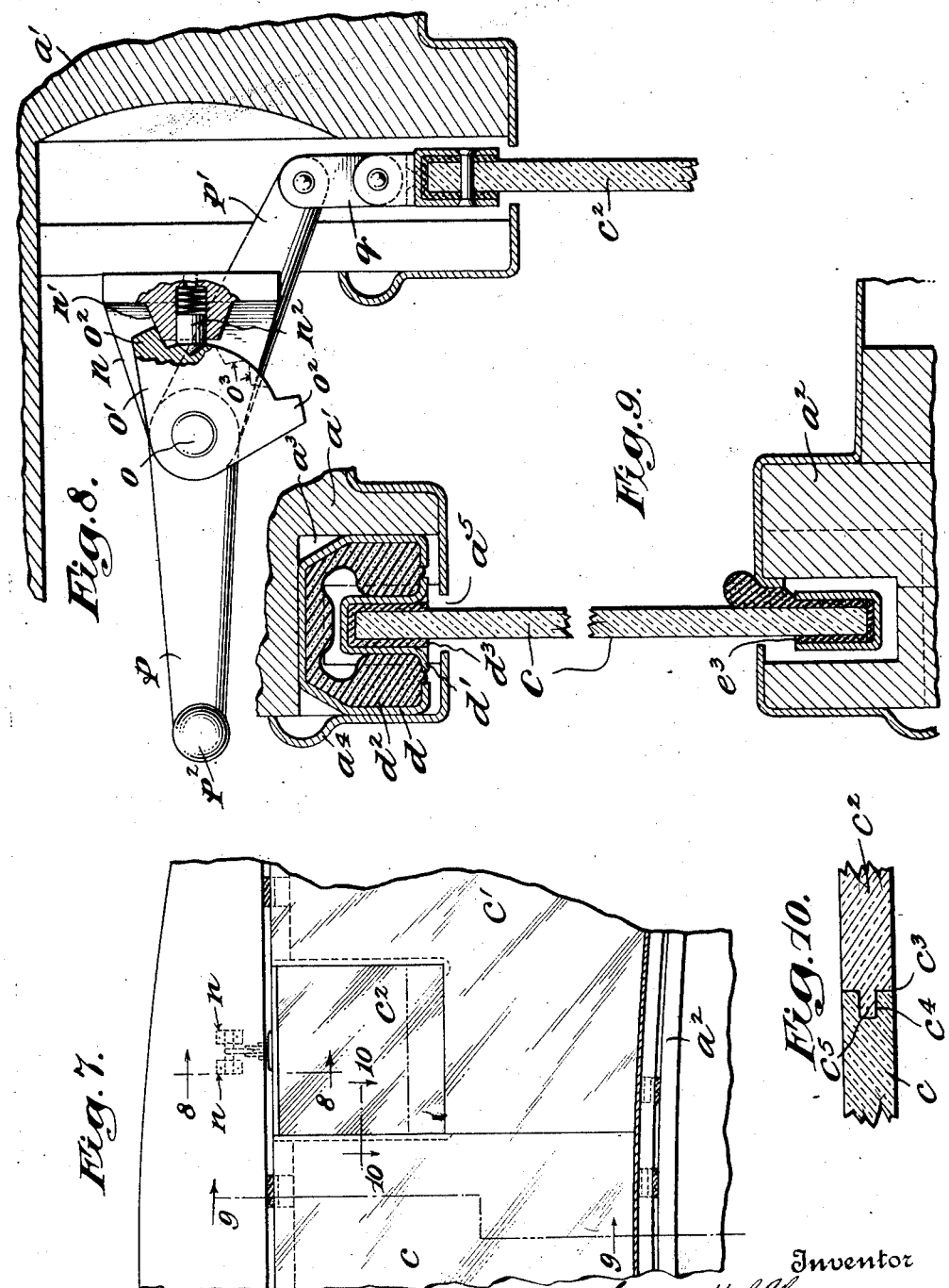

Patented May 8, 1928.

1,668,682

UNITED STATES PATENT OFFICE.

FRANK KOHLBERGER, OF WHITESTONE, NEW YORK, ASSIGNOR TO INTERNATIONAL MOTOR COMPANY, OF NEW YORK, N. Y., A CORPORATION OF DELAWARE.

WINDSHIELD.

Application filed June 17, 1926. Serial No. 116,509.

The present invention deals with windshields for automobiles and the like where it is necessary to have a clear vision ahead at all times.

It frequently happens that in the winter time, during a snowfall, the windshield becomes coated with ice or snow and vision therethrough becomes impaired or totally obstructed. The windshield wipers available are not able to maintain a clear vision portion on the outer surface when the snowfall is heavy or when the same freezes and it is an object of the present invention to provide a structure which will enable the driver to see the road ahead and approaching traffic under all conditions.

The manner in which this is done is by providing a portion of the windshield with a slide which may be raised or lowered to produce an open space therein, in the line of vision of the operator.

It is a further object of this invention to provide a windshield of the above character which is essentially clear vision, all obstructing portions being eliminated.

Further objects and advantages will be pointed out as the description proceeds, reference being had now to the accompanying drawings forming a part hereof, wherein:

Figure 1 is a section on the line 1—1 of Figure 2, and looking in the direction of the arrows.

Figure 2 is a front elevation of one form of the device.

Figure 3 is a section on the line 3—3 of Figure 2 and looking in the direction of the arrows.

Figure 4 is a section on the line 4—4 of Figure 3 and looking in the direction of the arrows.

Figure 5 is a section on the line 5—5 of Figure 2 and looking in the direction of the arrows.

Figure 6 is a section on the line 6—6 of Figure 2 and looking in the direction of the arrows.

Figure 7 is a front elevation of another form of my device.

Figure 8 is a section on the line 8—8 of Figure 7 and looking in the direction of the arrows.

Figure 9 is a section on the line 9—9 of Figure 7 and looking in the direction of the arrows.

Figure 10 is a section on the line 10—10 of Figure 7 showing a modified way of mounting the sliding pane.

In Figure 1 $a$ represents the standards or uprights of the vehicle body upon which side panes $b$ are pivotally mounted. These panes may be secured in a desired position by means of links $b'$ and screws $b^2$ which are secured to the pane and frame, respectively, and enable the window to be adjusted for a suitable degree of ventilation. The top of the car is indicated at $a'$ and the cowl at $a^2$.

The front pane or windshield consists of three sections $c$, $c'$ and $c^2$, the first two of which are permanently secured between the cowl and top in the following manner and the third slidably mounted between the two as hereinafter described.

Referring more particularly to Figures 5, 6 and 9 the top is cut away to form two sides of a housing as indicated at $a^3$ within which an inner housing $d$ is clamped by a face plate $a^4$. In the inner housing $d$ a block of rubber or other non-metallic and resilient substance $d^2$ is provided and this serves as a cushioning element between the glass and metal parts. In order to prolong the life of these rubber elements they are placed under compression when installed. A seat $d'$ is secured within the block by compression and between this seat and the glass a liner of rubber or other suitable material $d^3$ is positioned. The glass is held in such position within the aperture $a^5$ of the outer housing and is cushioned in an obvious manner by the above described structure.

At the cowl, the glass is secured in a recessed portion $a^6$ in which a housing $e$, similar to $d$ is clamped by face plate $a^7$ which bears on the upper portion of the frame above the dash. Between this plate and the cowl is an aperture or slot $a^8$ within which the glass rests. The lower edge of the glass is secured similarly to the upper edge by block $e'$, seat $e^2$ and liner $e^3$.

The front portions of the windshield comprising the three sections are secured together by suitable means which do not obstruct the vision. One form of such means is shown in Figures 1 and 2 wherein strips of glass $f$ are cemented to the stationary portions $c$ and $c'$ and thus supply grooves in which the movable pane may slide. In Figures 7 and 10 another form is shown wherein the stationary panes are grooved as at $c^4$ along the vertical edges $c^3$. The sliding pane has tongues $c^5$ which engage the groove to slide therein.

In order to prevent water from flowing down the pane and into the housing, a bead $g$ of rubber or other suitable material is positioned by strip $g'$ to bear against the glass and provide a water tight joint. In the form where the window is raised upwardly the bead may be integral with the liner $c^3$ as shown in Figure 9.

To raise or lower the window in the form shown in Figures 1 through 6, a bracket $h$ is secured to or formed integral with the seat or clamp $h'$ at the lower edge of the pane and terminates in an inwardly extending toe $h^2$. The bracket is slotted at $h^3$ to permit it to slide by the operating shaft.

An operating shaft $i$ is mounted in a bearing hub $j$ which is secured to the dash of the vehicle. On the operating side of the dash a hand wheel $i'$ is keyed to the shaft and on the opposed face of the bearing hub there are provided radial grooves $j'$ in which a pin $i^2$ may rest. This pin is made to yieldingly engage the grooves by a means to be hereinafter described.

A hub $i^3$ is mounted on the shaft $i$ and is slidably keyed thereto. An apron $k$ which is carried by the cowl serves as a bearing for the hub and a spring $i^4$ around the shaft $i$ engages the hub and is compressed by washer $i^5$ held by the pin $i^6$. This spring serves to hold the pin $i^2$ in any slot to which it has been moved.

Secured to the bracket $h$ by eye-bolt $h^4$ and adjustable eye $h^5$ is a flexible cord $l$ which takes one turn over the hub $i^3$ and is placed under tension by taps $h^6$ on the eye $h^5$. It will thus be seen that when the hand wheel $i'$ is pulled out and turned, the sliding pane will be moved accordingly.

Below the apron $k$ is provided a channel $m$ which collects any water which might pass between the glass and the cowl and a pipe $m'$ carries the collected water off, as shown in Figure 2.

In Figure 8 a mechanism is shown for positioning the upwardly sliding pane of Figure 7. This structure consists of brackets $n$ which are secured to the vehicle top $a'$ and which mount a shaft $o$ which may be integral with a lever $p$ having a crank arm $p'$. Link $q$ connects the crank arm with the top of the window. The lever $p$ is provided with a handle $p^2$ and turning with the shaft $o$ is a flange $o'$ having limit lugs $o^2$. These lugs engage a stud $n'$ in which is contained a spring pressed detent $n^2$ which engages depressions $o^3$ in the flange $o'$ to hold the glass in a desired position. The pane may be lifted to a desired position by the handle $p^2$.

Either of the above types may be used, depending upon the convenience of the operator and the invention is not to be limited save as set forth in the appended claims.

What I claim is:

1. In a vehicle windshield, a fixed portion, a movable portion, a shaft rotatably mounted on the vehicle dash, means to turn the shaft, means selectively to hold the shaft in a turned position, and an impositive connection between the shaft and the movable portion for transmitting movement of the former to the latter.

2. In a vehicle windshield, a fixed portion, a movable portion, a shaft rotatably mounted on the vehicle dash, means to turn the shaft, means to hold the shaft in a turned position, a bracket on the movable portion, and a flexible cord passing around the shaft and secured at its ends to the bracket.

3. In a vehicle windshield, a fixed portion, a movable portion, a shaft rotatably mounted on the vehicle dash, means to turn the shaft, means to hold the shaft in a turned position, a bracket on the movable portion, a slot in the bracket through which the shaft passes, a hub on the shaft, a flexible cord passing around the hub, and means for securing the cord to the bracket adjacent the ends of the slot.

4. In a vehicle windshield, a fixed portion, a movable portion, a shaft rotatably mounted on the vehicle dash, a bearing for mounting the shaft in the dash, a hand wheel secured to the shaft, a pin on the shaft, radial slots in the bearing and engageable by the pin, a hub slidably keyed to the shaft, a spring mounted on the shaft and bearing against the hub to yieldingly engage the pin with the adjacent slot in the bearing, a bracket on the movable portion of the windshield, a slot in the bracket through which the shaft and hub extend, a flexible cord passing around the hub, and means to secure the cord to the bracket adjacent the ends thereof.

This specification signed this 14th day of June, A. D. 1926.

FRANK KOHLBERGER.